(12) United States Patent
Tienhaaraa et al.

(10) Patent No.: US 9,751,092 B2
(45) Date of Patent: Sep. 5, 2017

(54) ELECTROSTATIC COALESCER AND METHOD FOR ELECTROSTATIC COALESCENCE

(71) Applicant: Sulzer Chemtech AG, Winterthur (CH)

(72) Inventors: Mika Kristian Sulevi Tienhaaraa, Oosterbeek (NL); Frederik Albert Lammers, Zoetermeer (NL)

(73) Assignee: Sulzer Chemtech AG, Winterthur (CH)

( * ) Notice: Subject to any disclaimer, the term of this patent is extended or adjusted under 35 U.S.C. 154(b) by 347 days.

(21) Appl. No.: 14/370,160

(22) PCT Filed: Jan. 2, 2013

(86) PCT No.: PCT/NL2013/050001
§ 371 (c)(1),
(2) Date: Jul. 1, 2014

(87) PCT Pub. No.: WO2013/103299
PCT Pub. Date: Jul. 11, 2013

(65) Prior Publication Data
US 2014/0339089 A1    Nov. 20, 2014

(30) Foreign Application Priority Data

Jan. 2, 2012 (NL) ........................ 2008071

(51) Int. Cl.
*B01D 17/06* (2006.01)
*C02F 1/48* (2006.01)
*C02F 1/46* (2006.01)
*B03C 11/00* (2006.01)
*C02F 1/461* (2006.01)
(Continued)

(52) U.S. Cl.
CPC ............ *B03C 11/00* (2013.01); *B01D 17/045* (2013.01); *B01D 17/06* (2013.01); *C02F 1/46104* (2013.01); *C02F 1/48* (2013.01); *B03C 2201/02* (2013.01); *C02F 2101/325* (2013.01)

(58) Field of Classification Search
CPC ..... B01D 17/06; B01D 17/045; B01D 17/046
See application file for complete search history.

(56) References Cited

U.S. PATENT DOCUMENTS 3,582,527 A * 6/1971 Lucas .................. B01D 17/06
  204/662
3,862,022 A   1/1975 Hermann
(Continued)

FOREIGN PATENT DOCUMENTS

NL    WO 2010114377 A1 * 10/2010   ......... B01D 17/0217
WO    2010051131 A1    5/2010
WO    2010131958 A1   11/2010

*Primary Examiner* — Brian W Cohen
(74) *Attorney, Agent, or Firm* — Larson & Anderson, LLC

(57) ABSTRACT

The invention relates to a device for electrostatic coalescence of liquid particles in a flowing fluid mixture, comprising: a tube having an feed opening located at the front side of the tube and a discharge opening located on the opposite side of the tube and a least one arrangement with flow guide vanes arranged in the tube, positioned in between the opened infeed side and an opposite opened outfeed side, for reducing the turbulence or for imparting a rotating movement to the fluid mixture flowing through the tube. The invention also relates to a method for electrostatic coalescence of liquid particles in a flowing fluid mixture.

20 Claims, 5 Drawing Sheets

(51) Int. Cl.
*B01D 17/04* (2006.01)
*C02F 101/32* (2006.01)

(56) References Cited

U.S. PATENT DOCUMENTS

| | | | |
|---|---|---|---|
| 3,980,541 A | | 9/1976 | Aine |
| 3,981,789 A | | 9/1976 | Harrison et al. |
| 5,587,057 A | | 12/1996 | Metzler et al. |
| 5,861,087 A | * | 1/1999 | Manning ............ B01D 17/0217 204/272 |
| 6,113,765 A | * | 9/2000 | Wagner ................ B01D 17/042 204/556 |
| 7,351,320 B2 | | 4/2008 | Sams |
| 2004/0094421 A1 | * | 5/2004 | Sams .................... B01D 17/00 204/554 |
| 2004/0232060 A1 | * | 11/2004 | Trapy ................ B01D 17/0217 210/243 |
| 2006/0000762 A1 | | 1/2006 | Hamid et al. |

* cited by examiner

ELECTROSTATIC COALESCER AND METHOD FOR ELECTROSTATIC COALESCENCE

CROSS-REFERENCE TO RELATED APPLICATIONS

This application is the United States national phase of International Application No. PCT/NL2013/050001 filed Jan. 2, 2013, and claims priority to Netherlands Patent Application No. 2008071 filed Jan. 2, 2012, the disclosures of which are hereby incorporated in their entirety by reference.

BACKGROUND OF THE INVENTION

Field of the Invention

The invention relates to a device for electrostatic coalescence of liquid particles in a flowing fluid mixture, especially for coalescence of water in an flowing water/oil fluid mixture, comprising: a tube having a feed opening located at the front side of the tube and a discharge opening located on the opposite side of the tube; power means for providing a current; and at least two electrodes located inside the tube electrically connected to the power means. The invention also relates to a method for electrostatic coalescence of liquid particles in a flowing fluid mixture, especially for coalescence of water in a flowing water/oil fluid mixture.

Description of Related Art

Separation of liquid flows with strong oil-water emulsions is known. Typically known electrostatic coalescers are vessel-based internals in large vessels. High viscosity crudes and heavy crude oils typically require long residence times for adequate liquid-liquid separation even with electrostatics in combination with high operating temperatures, thus resulting in a bulky and heavy vessel. Such step in the separation is also referred to as to "breaking the emulsion" and is, among others known from U.S. Pat. No. 7,351,320. wherein the augmentation of the separation of an emulsion is disclosed making use of an AC voltage source employing a specific modulation pattern.

The intention of the present invention is to further augment the inline coalescence in reduced size process equipment of a fluid mixture at enhanced efficiency and effectively.

SUMMARY OF THE INVENTION

The present invention provides a device for electrostatic coalescence of liquid particles in a flowing fluid mixture, of the type according the preamble that also comprises a least one arrangement with flow guide vanes arranged in the tube, positioned in between the opened infeed side and an opposite opened outfeed side, for forcing the movement to the fluid mixture flowing through the tube, possibly with imparting a rotation to it. Different from the teachings according the prior art wherein a mere linear flow of the mixture in the vicinity of the electrodes is required the arrangement with flow guide vanes can force the movement of the fluid in the vicinity of the electrodes such that it either provides a rotating flow or that it reduces the turbulence. This guidance of the mixture, that leads away from the existing coalescers of this type, results in the ability of an electrostatic coalescer according the present invention to provide a better coalescing performance than a prior art electrostatic coalescer. The arrangement with flow guide vanes may for instance be implemented as a swirl element. Due to the turbulence the chance for contact/meeting of liquid particles to coalesce with other liquid particles to coalesce increases thus the coalescing effect may be enhanced at least as the turbulence is not, at least not in a serious rate, breaking up already coalesced particles. The arrangement with flow guide vanes can reduce the turbulence effects such that breaking up will not occur or it can generate centrifugal forces, acting along the axis of the pipe on the polarized liquid particles to coalesce (droplets). These particles will start to slip with the continuous phase with the slip velocity depending on the particle size. The differences in slip velocities for different sized particles will further support (increase) the coalescence in addition to coalescence due to any existing turbulent fluctuations. An option is to couple two or more coalescing devices according the present invention in line, as to coalesce the mixture subsequently plural times. The coalescence by means of electrostatics supported with induced swirl is preferably conducted on viscous liquid flow holding no gas or only low levels of gas.

In an embodiment the power means are AC power means to provide an alternating current. With such an alternating electric field the particle to coalesce may be given multiple impacts so to be more or less "shaken" which also further supports the coalescing effect sought for.

At least one of the electrodes may be embodied as an arrangement with flow guide vanes. By combining the arrangement with flow guide vanes with at least one of the electrodes less parts are required as well as that the guiding the movement of the mixture and providing an electric field to act on the mixture may both be executed efficiently.

The arrangement with flow guide vanes may comprise at least one helical blade or, as an alternative may comprise plural helical blades, dependent on the circumstances the electrostatic coalescer according the present invention is to be used. To impart a rotational movement to the mixture without providing too much turbulence to the fluid flow the guide vanes can start and/or end in line with the axial direction of the pipe. A linear flowing fluid can be "picked up" smoothly by a guide vane that starts in line with the axial direction of the pipe. The same applies for a guide vane ending in line with the axial direction of the pipe; such guide vane ending provides a smooth transition from the rotating fluid flow to an, again, linear fluid flow. The helical blades may uniformly be distributed with e.g. subsequent electrified and grounded blades. As to prevent the tube being electrically loaded both electrodes may be electrically insulated from the tube.

Two different electrodes may act as two cooperating helical blades. Again such construction is efficient as the blades combine two different functions but also the distance between two electrodes may be controlled.

In a further embodiment of the electrostatic coalesce according the present invention plural arrangements with flow guide vanes may be provided in co-centric tubes. As the guiding of the flow is so imparted in multiple annuli the average distance of a coalesced particle to the inner wall of a tube is limited if compared to a single tube coalesce with the same capacity.

In a specific embodiment a feed pipe is connecting to the feed opening such that the axial direction of the feed pipe at the connection with the tube has at least a component that is in line with the axial direction of the tube. In a more specific embodiment of such connection the feed pipe at the connection with the tube is in line with the axial direction of the tube; so to be an axial feed. The at least axial component in the flow direction of the fluid mixture prevents too much turbulence in the fluid flow that would negatively influence the coalescence sought for.

In another embodiment the tube substantially may have the form of a cylinder jacket. Such tubes are common available as shelf parts and is also beneficial to the control of the flow pattern and to any subsequent separation separation processes. The tube can be oriented in any position, for instance horizontally or vertically. A first separation can occur in axial direction along the pipe walls through a pipe section with the arrangement with flow guide vanes and further downstream. For example a free water phase may be extracted from the liquid flow and the remaining liquid, primarily crude oil with low percentage of water, will enter smoothly an associated downstream separator vessel or pipe that can efficiently fulfil a subsequent phase separation of the fractions.

The at least one arrangement with flow guide vanes may be arranged in a tube with a length of 0.1-2 meters, and over least 80% of the length of the tube arrangements with flow guide vanes may be provided. The device may for example be embedded inside the pipe or in an inlet pipe section of a small separator vessel. With only limited construction lengths of the device according the recent invention beneficial result may be realised.

For effective construction and maintenance the power means for providing an alternating current may be located outside the tube. Such power means may provide an alternating current of 50-600 Hz, while the field intensity may be 2-6 kV/cm.

For a suitable functioning of the device the arrangement with flow guide vanes may at least partially be covered with an electrically insulating coating, like for instance a Teflon coating.

The present invention also provides a method for electrostatic coalescence of liquid particles in a flowing fluid mixture, especially for coalescence of water in a flowing water/oil fluid mixture, comprising the steps of: A) feeding the fluid mixture to a pipe; B) providing an electric field to act on the mixture flowing through the pipe; C) guiding the mixture flowing through the tube either to impart a rotating movement to the fluid or to reduce the turbulence levels to prevent break-up; and D) discharging the at least partial coalesced mixture from the tube. With this method the advantages as present before in relation to the electrostatic coalescence device can be realised, which are here included by way of reference. To speed up the process the steps B) and C) may be combined. And as for the duration of the steps B) and C); these steps may take for instance 0.1-10 seconds, preferably 0.5-5 seconds and the power may be provided as an alternating current of 50-600 Hz at 2-6 kV/cm. Within such operative ranges positive effects of the present invention are envisaged.

Later on during the process of acting an electric field on the mixture the guiding of the fluid may be diminished, e.g. by changing the speed of at least one arrangement with flow guide vanes or by diminishing the number of blades of an, at the start of the process, plural bladed arrangement with flow guide vanes. Earlier ending of at least one of the blades, can lead to setting/polishing of the at least partial coalesced mixture. The invention provides a method to break emulsions rapidly making use of inline arrangement (pipe based), thus with a minimum of hold-up volume.

Furthermore the at least partial coalesced mixture discharged from the tube may be provided a subsequent separation processing. In practice e.g. a multi staged separation processing according the present invention may be executed and/or other down stream pipe-based separator or vessel type of separator may be used for subsequent processing of the at least partially coalesced fluid mixture. A further embodiment provides a coalescer with plural sections, depending on the emulsion stability.

BRIEF DESCRIPTION OF THE DRAWINGS

The invention will be further elucidated herein below on the basis of the non-limitative exemplary embodiments shown in the following figures. Herein.

DESCRIPTION OF THE INVENTION

Figure 1:
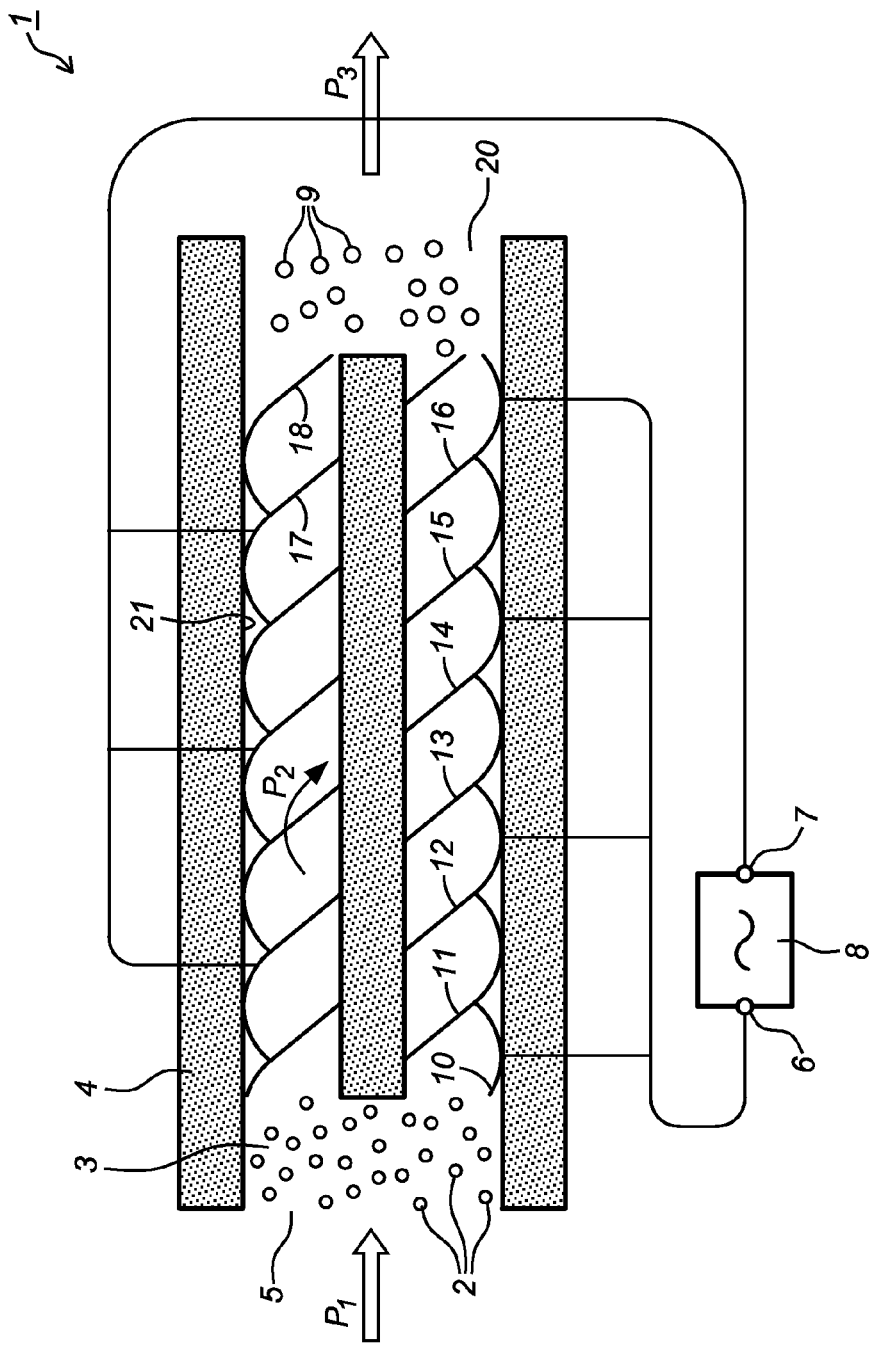
FIG. 1 is a schematic cross-section view of an embodiment of a coalescence device according to the present invention.

FIG. 1 shows an electrostatic coalescence device 1 for liquid particles 2 in a flowing fluid mixture 3 that a fed according to arrow $P_1$ to a tube 4 having a feed opening 5. In the tube 4 helical blades 10-18 are arranged that impart a rotational movement according arrow $P_2$ to the fluid mixture 3. The fluid mixture 3 that is fed ($P_1$) to the coalescence device 1 comprises small relative liquid particles 2 that have a different composition compared to the main component of the fluid mixture 3, for instance water particles 2 in an oil flow. The water particles 2 (e.g. an emulsion of oil and water) are randomly distributed in the mixture 3 while entering the tube 4 at the feed opening 5. The helical blades 10-18 not only impart a rotational movement to the fluid mixture 3, the helical blades 10-18 are also providing an electric field to act on the mixture 3. The helical blades 10-18 are alternately electrically connected to the poles 6, 7 of an electric power source 8, so the helical blades 10, 12, 14, 16 and otherwise the helical blades 11, 13, 15, 17 also act as electrodes. The combination of the rotational movement to the fluid mixture 3 with the electric field acting on the mixture 3 results in the effective coalescence of the water particles 2 resulting in substantially larger water particles 9 when the mixture 3 leaves ($P_3$) the discharge opening 20 of the tube 4 compared to the size of the water particles 2 at the feed opening 5. An even further effect that is reached with the electrostatic coalescence device 1 is that the rotational movement according arrow $P_2$ of the fluid mixture 3 also results in a further pre-separation of the water particles 9 from the main flow of the fluid mixture 3. Due to the rotation the heavier fraction will be urged towards the inner wall 21 of the tube 4 while the lighter fraction (the water particles 9 in this example) will concentrate more to the centre of the tube 4. this 3effect is illustrated in that the water particles 9 when leaving the tube 4 ($P_3$) are more concentrated to the centre of the fluid flow.

Figure 2:
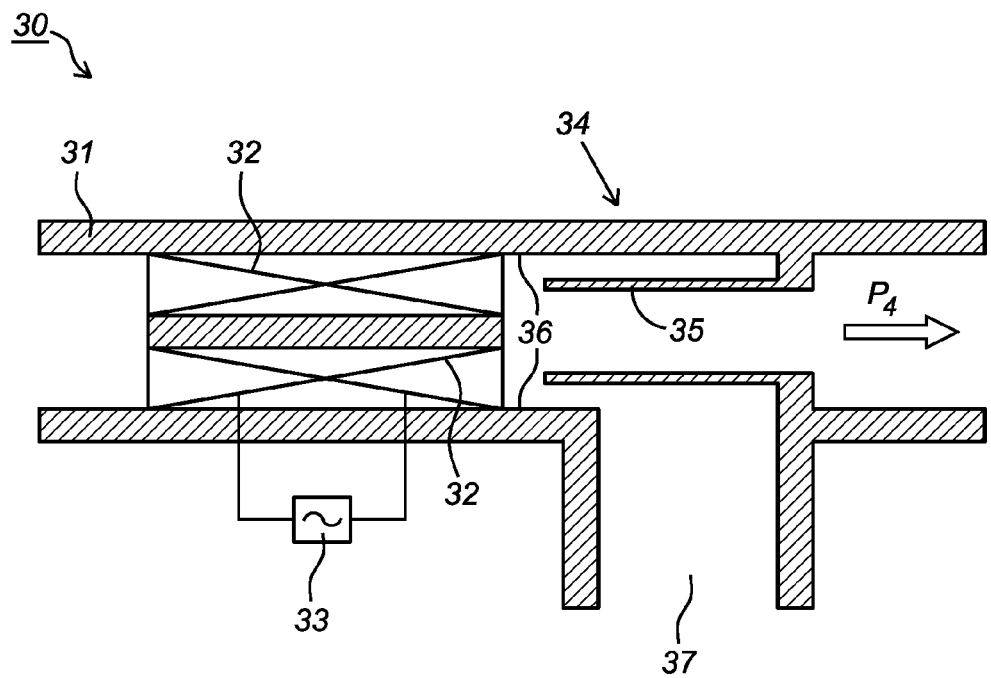
FIG. 2 is a schematic cross-section view of an alternative embodiment of a coalescence device according to the invention.

FIG. 2 shows an electrostatic coalescence device 30 with a tube 31 wherein electrostatic arrangements with flow guide vanes 32 are arranged that are connected to a power source 33. For so far the device 30 is more or less in line with the electrostatic coalescence device 1 as shown in FIG. 1. However in the coalescence device 30 a subsequent pre-separator 34 is also arranged in the tube 31. A co-centric additional inner tube 35 is located behind (seen in the direction of the fluid flow) the electrostatic arrangements with flow guide vanes 32 so that any heavier fraction (e.g. free water phase) that has been pre-separated long the tube wall 36 can be extracted via an additional discharge 37 connecting to the space between the additional inner tube 35 and the tube wall 36. The remaining part of the mixture flowing ($P_4$) through the additional inner tube 35 is thus pre-separated and has an enhanced concentration of the lighter fraction than the mixture that has been fed to the electrostatic coalescence device 30. In the example with the substantially larger water particles 9 as shown in FIG. 1 the concentration of oil (e.g crude oil coming from an oil well) will be enhanced in the fluid flow leaving the electrostatic coalescence device 30 ($P_4$). The extended electrostatic coalescence device 30 as shown in this figure including the subsequent pre-separator 34 is also part of the present invention.

Figure 3:
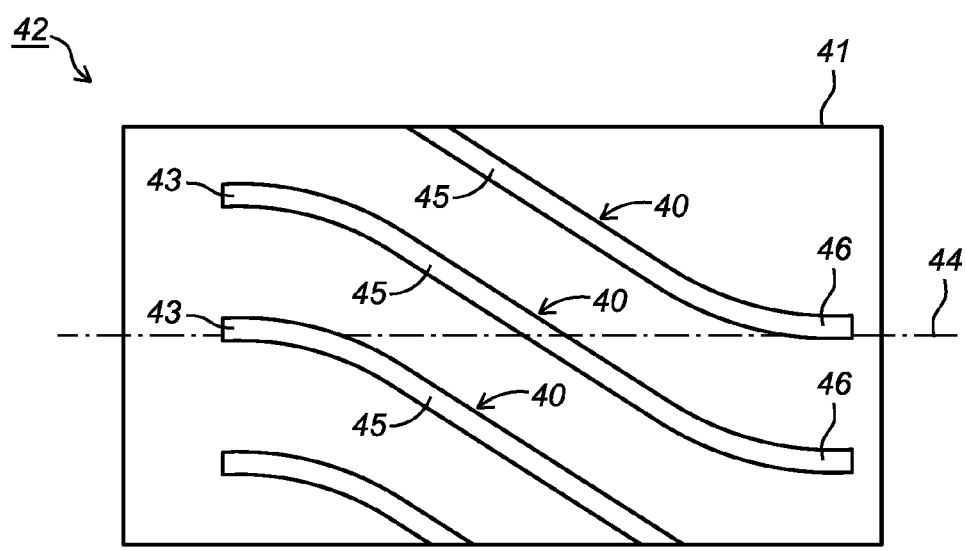
FIG. 3 is a detailed view of arrangement with flow guide vanes as part of an embodiment of a coalescence device according to the present invention.

FIG. 3 shows a detail of some arrangements with flow guide vanes 40 places in a tube 41 as part of a further embodiment 42 of a coalescence device according to the present invention. Each of the arrangements with flow guide vanes 40 is made up of a guide vane introduction part 43 that is in line with the axial direction 44 of the pipe 41 to pick up any mixture flowing through the tube 41 smoothly. The guide vane introduction part 43 transposes in a guide vane intermediate part 45 that has a roughly a helical shape to impart the rotating movement to the fluid mixture. The guide vane intermediate part 45 at its turn transposes again in a guide vane trailing introduction part 46 as to provide a smooth transition from the rotating fluid flow to an, again, linear fluid flow.

Figure 4A:
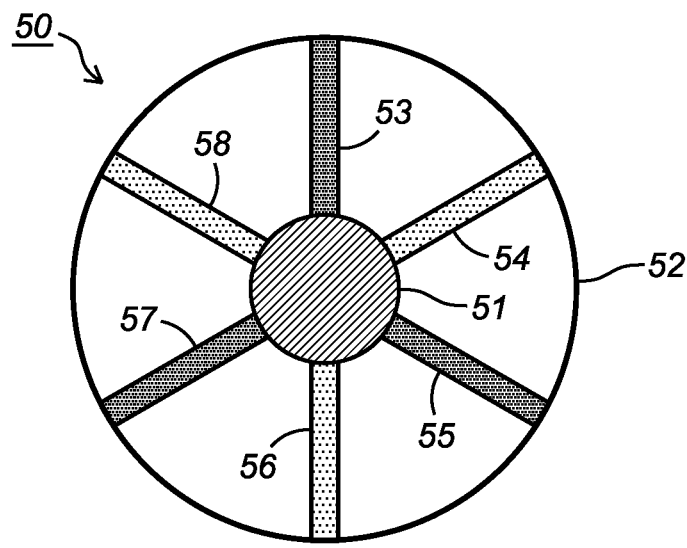
FIGS. 4A and 4B show cross-sections through two embodiments of coalescence devices according to the present invention.
Figure 4B:
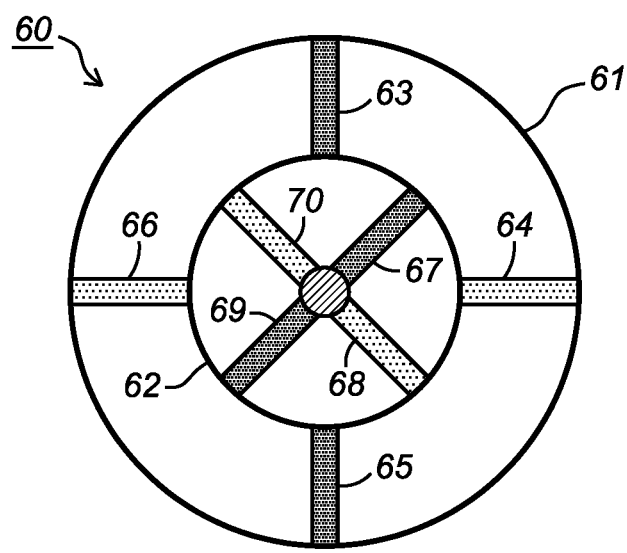

FIG. 4A shows a cross-section through a coalescence device 50 according to the present invention wherein between a core 51 and a tube wall 52 six guide vanes 53-58 are installed, the guide vanes 53, 55, 57 for instance being charged and the intermediate blades 54, 56, 58 being grounded. FIG. 4B shows a cross-section through a coalescence device 60 according to the present invention wherein two co-centric tubes 61, 62 both house four arrangements with flow guide vanes 63-66 and 67-70. The guide vanes 63, 65 and 67, 69 for instance being charged and the intermediate blades 64, 66 and 68, 70 being grounded. All blades 63-70 are electrically insulated from the tubes 61, 62 and for instance coated with a Teflon coating.

Figure 5:
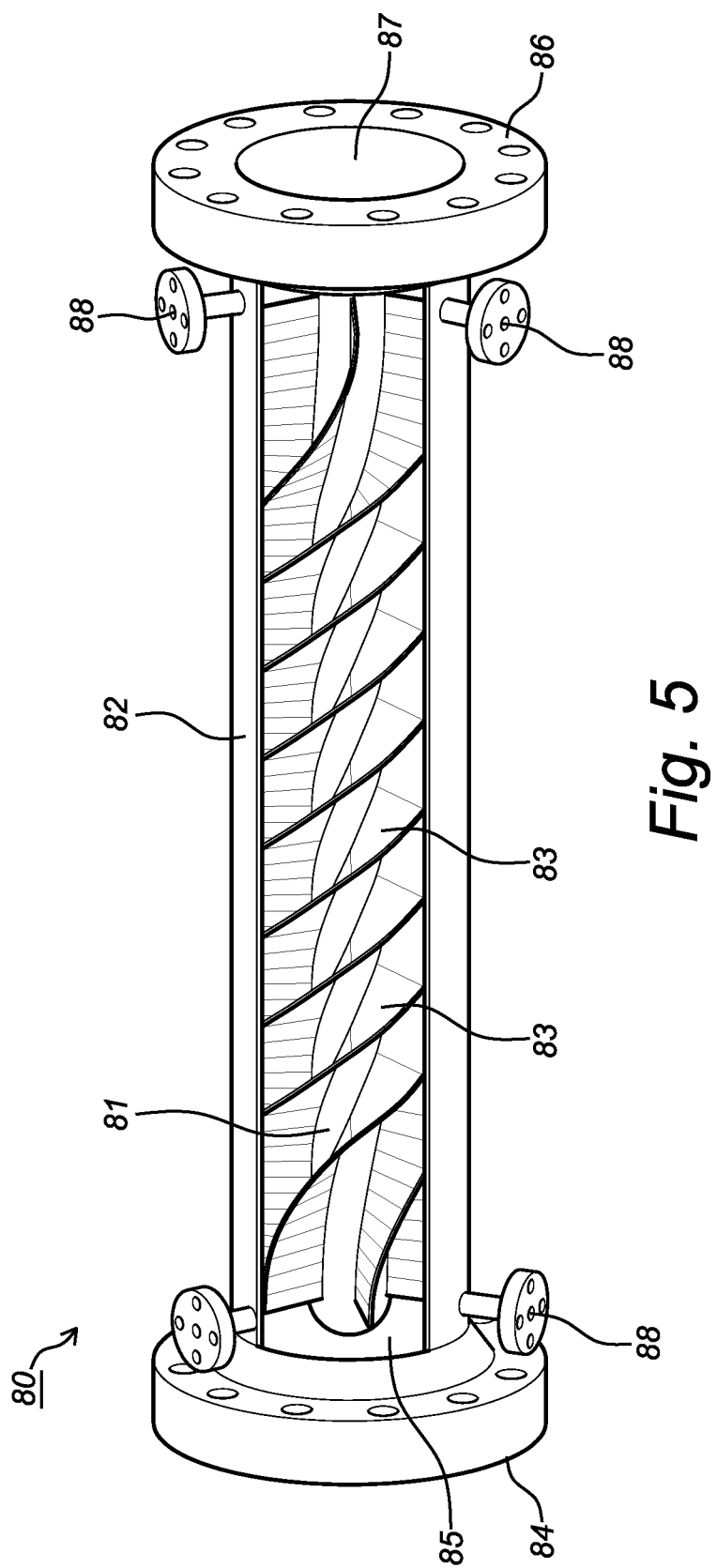
FIG. 5 a three-dimensional view of an alternative embodiment of a coalescence device according to the present invention.

FIG. 5 shows a three-dimensional view of an embodiment of a coalescence device 80 according to the present invention with a core 81 and a tube wall 82 with in-between helical guide vanes 83. A first flange 84 connected to the tube wall 82 houses a feed opening 85 for the mixture to be processed and a second flange 86 houses a discharge opening 87 for the outlet of the at least partially coalesced mixture that has been processed in the coalescer 80. The helical blades 83 are alternately electrically connected to the poles of an electric power source, that is not represented in this figure, through electric passages 88.

Figure 6:
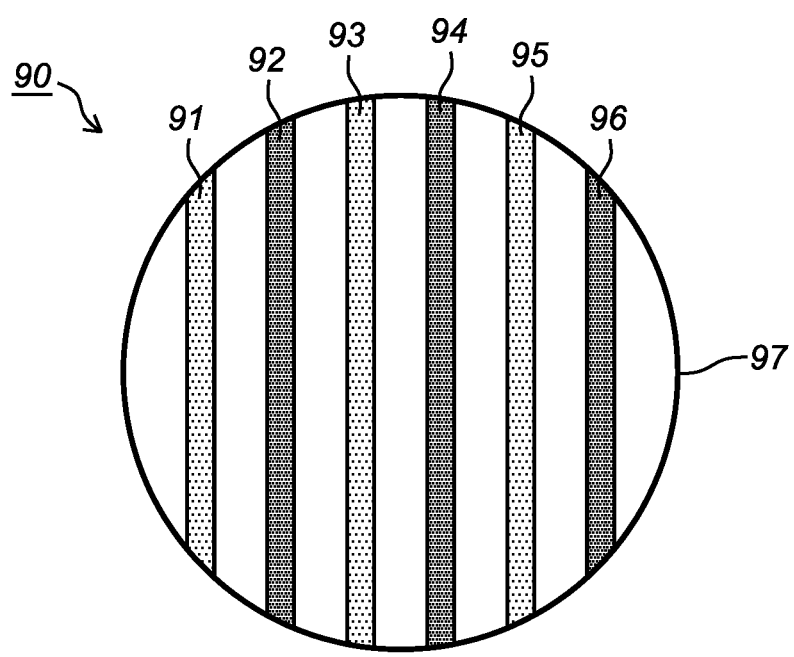
FIG. 6 shows a cross-section through a further alternative embodiment of a coalescence device according to the present invention.

FIG. 6 shows a cross-section to a coalescence device 90 according to the present invention, with flow guide vanes 91-96 arranged in a tube 97. The flow guide vanes 91, 93 and 95 are all connected to the same electric pole, e.g. grounded, while the intermediate flow guide vanes 92, 94 and 96 are also all connected to the same pole, e.g. the charged pole. With such an implementation of the flow guide vanes 91-96 the distance between two opposite poled flow guide vanes 91-95; 92-96 may be reduced to enhance the coalescing effect sought for.

The invention claimed is:

1. A device for electrostatic coalescence of liquid particles in a flowing fluid mixture, comprising:
   an outer tube having a wall, a feed opening located at a front side of the outer tube, a discharge opening located on an opposite side of the outer tube, and an intermediate discharge opening located between the feed opening and the discharge opening;
   power means for providing a current; and
   at least two electrodes located inside the outer tube electrically connected to the power means; wherein the device also comprises a least one arrangement with flow guide vanes arranged in the outer tube, positioned in between the feed opening and the discharge opening located on the opposite side of the outer tube, for reducing the turbulence or for imparting a rotating movement to the fluid mixture flowing through the outer tube, and
   a co-centric inner tube arranged in the outer tube and located, as seen in the direction of the fluid flow, behind the at least one arrangement with flow aide vanes, wherein the co-centric inner tube has a diameter less than the diameter of the outer tube and is positioned to provide a space between the inner tube and the wall of the outer tube, wherein the intermediate discharge opening connects to the space between the co-centric inner tube and the wall of the outer tube.

2. The device as claimed in claim 1, wherein the power means are AC power means to provide an alternating current.

3. The device as claimed in claim 1, wherein at least one of the electrodes is an arrangement with flow guide vanes.

4. The device as claimed in claim 1, wherein the arrangement with flow guide vanes comprises at least one helical blade.

5. The device as claimed in claim 1, wherein the at least two electrodes are electrically insulated from the outer tube.

6. The device as claimed in claim 1, wherein two different electrodes are two cooperating helical blades.

7. The device as claimed in claim 1, wherein plural arrangements with flow guide vanes are provided in co-centric tubes.

8. The device as claimed in claim 1, wherein a feed pipe is connecting to the feed opening such that the axial direction of the feed pipe at the connection with the outer tube has at least a component that is in line with the axial direction of the outer tube.

9. The device as claimed in claim 8, wherein the feed pipe at the connection with the outer tube is in line with the axial direction of the outer tube.

10. The device as claimed in claim 1, wherein the outer tube substantially is in the form of a cylinder jacket.

11. The device as claimed in claim 1, wherein the at least one arrangement with flow guide vanes arranged in the outer tube has a length of 0.1-2 meters.

12. The device as claimed in claim 1, wherein over a least 80% of the length of the outer tube arrangements with flow guide vanes are provided.

13. The device as claimed in claim 1, wherein the means for providing an alternating current located outside the outer tube.

14. The device as claimed in claim 1, wherein the power means provide an alternating current of 50-600 Hz at 2-6 kV/cm.

15. The device as claimed in claim 1, wherein the arrangement with flow guide vanes is at least partially covered with an electrically insulating coating.

16. A method for electrostatic coalescence of liquid particles in a flowing fluid mixture, comprising the steps of: A) providing the device of claim 1; B) feeding the fluid mixture to the feed opening located at the front side of the outer tube so that the fluid mixture flows through the outer tube; C) providing an electric field to act on the fluid mixture flowing through the outer tube; D) reducing the turbulence or imparting a rotating movement to the fluid mixture flowing through the outer tube; and E) discharging an at least partially coalesced mixture from the outer tube.

17. The method as claimed in claim 16, wherein steps C) and D) are combined.

18. The method as claimed in claim 16, wherein the duration of steps C) and D) is 0.1-10 seconds.

19. The method as claimed in claim 16, wherein the electrical field is provided by an alternating current of 50-600 Hz at 2-6 kV/cm.

20. The method as claimed in claim 16, wherein the at least partially coalesced mixture discharged from the outer tube is provided to a subsequent separation processing step.

* * * * *